(12) United States Patent
Mazumder et al.

(10) Patent No.: US 6,479,168 B2
(45) Date of Patent: Nov. 12, 2002

(54) ALLOY BASED LASER WELDING

(75) Inventors: Jyoti Mazumder, Ann Arbor, MI (US); Ashish Dasgupta, Ann Arbor, MI (US); Michael Bembenek, Ortonville, MI (US)

(73) Assignee: The Regents of The University of Michigan, Ann Arbor, MI (US)

( * ) Notice: Subject to any disclaimer, the term of this patent is extended or adjusted under 35 U.S.C. 154(b) by 14 days.

(21) Appl. No.: 09/825,576

(22) Filed: Apr. 3, 2001

(65) Prior Publication Data

US 2002/0142184 A1 Oct. 3, 2002

(51) Int. Cl.$^7$ .......................... B32B 15/18; B23K 26/00
(52) U.S. Cl. ................. 428/659; 148/525; 148/527; 148/533; 148/536; 219/121.63; 219/121.64; 219/121.65; 219/121.66; 219/121.85; 403/217; 403/404; 428/594; 428/606; 428/609; 428/613; 428/674; 428/676; 428/677; 428/926; 428/934
(58) Field of Search ................................ 428/659, 594, 428/606, 609, 613, 674, 676, 677, 926, 934; 403/217, 404; 148/525, 527, 533, 536; 219/121.63, 121.64, 121.65, 121.66, 121.85

(56) References Cited

U.S. PATENT DOCUMENTS

| | | | |
|---|---|---|---|
| 3,969,604 A | * | 7/1976 | Baardsen ............... 219/121.64 |
| 4,167,662 A | | 9/1979 | Steen |
| 4,642,446 A | | 2/1987 | Pennington |
| 4,684,779 A | | 8/1987 | Berlinger et al. |
| 4,873,415 A | | 10/1989 | Johnson et al. |
| 5,142,119 A | | 8/1992 | Hillman et al. |
| 5,183,992 A | | 2/1993 | Bilge et al. |
| 5,187,346 A | | 2/1993 | Bilge et al. |
| 5,216,220 A | | 6/1993 | Davis et al. |
| 5,247,155 A | | 9/1993 | Steen et al. |
| 5,371,337 A | | 12/1994 | Campbell et al. |
| 5,539,180 A | | 7/1996 | Mori et al. |
| 5,595,670 A | | 1/1997 | Mombo-Caristan |
| 5,618,452 A | | 4/1997 | Matubara et al. |
| 5,831,239 A | | 11/1998 | Matubara et al. |

OTHER PUBLICATIONS

"Laser Welding of Zn–Coated Sheet Steels" by M.P. Graham, H.W. Kerr, D.C. Weckman, University of Waterloo, Department of Mechanical Engineering, Waterloo, Ontario, Canada, SPIE vol. 2703, p. 170–183. (No date given).

(List continued on next page.)

Primary Examiner—Robert R. Koehler
(74) Attorney, Agent, or Firm—Harness, Dickey & Pierce, P.L.C.

(57) ABSTRACT

A method is disclosed for laser lap welding a pair of metal members together. At least one of the pair of metals having a protective metal layer. Each of the metal members having a melt temperature greater than the melt temperature of the protective metal layer. The method includes placing one end of the pair of metal members in an overlapping relation to another end of the pair of metal members to form an overlapping section. The method also includes inserting a metal alloying agent between the pair of metal members of the overlapping section to form a gap therebetween. A laser welder is used to join the pair of metal members and the alloy agent together so that the protective metal layer and the alloying agent are melted to form an alloy layer between the pair of metal members.

20 Claims, 2 Drawing Sheets

OTHER PUBLICATIONS

"Process Behaviour During High Power $CO_2$ Laser WElding of Zinc Coated Steel", by Claus Bagger, Isamu Miyamoto, Flemming Olsen, H. Maruo, University of Denmark and Osaka University, Proceedings of LAMP '92, Nagaoka (Jun., 1992), p. 553–558.

"Laser Welding of Zinc Coated Steel" by R. Akhter, W.M. Steen, University of Liverpool, UK, and D. Cruciani, Instituto RTM, Italy, Proc. 5th Int. Conf. Lasers in Manufacturing, Sep. 1988, p. 195–206.

"Laser Welding of Zinc Coated Steel" by Johan Heyden, Klas Nilsson, Claes Magnusson, Lulea University of Technology, Lulea, Sweden, Lasers In Manufacturing, Jun., 1989, p. 161–167.

"Laser Beam Welding in Car Body Making" by R. Imhoff, K. Behler, W. Gatzweiler, E. Beyer, Fraunhofer–Institut fur Lasertechnik, Aschen, West Germany, Sep. 1988, IFS Ltd, p. 247–258.

"Nd–YAG Laser Welding of Bare and Galvanised Steels" by S.C. Kennedy, I.M. Norris, The Welding Institute, UK, SAE Technical Paper Series 890887, International Congress and Exposition, Detroit, MI, Feb. 27–Mar. 3, 1989, p. 1–8.

Effects of Weld Discontinuities on Fatigue Strength of Laser Beam Welds by P.–C. Wang, General Motors Research Laboratories, Warren, MI and S. Davidson, University of Michigan, Welding Research Supplement, Jun. 1992, p. 209–217.

"Calculation of Laser Beam Weld Specification for Automotive Sheet Steel" by P.–C. Wang, General Motors Corp., Warren, MI, Welding Research Supplement Apr. 1993, p. 155–163.

* cited by examiner

ALLOY BASED LASER WELDING

FIELD OF THE INVENTION

The present invention generally relates to a laser welded joint and method and, more particularly, to a laser welded joint and method especially for fusion welding overlapping zinc coated metal plates.

BACKGROUND OF THE INVENTION

Galvanized steel is used extensively in the automotive industry because of its low cost, availability and corrosion resistive properties. It is the preferred material for auto-body manufacturing which is generally joined by fusion welding. However, fusion welding of coated zinc steel presents a challenge for manufacturing engineers because of the low melting point of zinc (907° C.) and the high melting point of steel (1530° C.). In lap welding of galvanized steel, the zinc layer evaporates violently at the weld interface resulting in undesirable high porosity in the welded joints.

One prior art solution uses a constant gap between overlapping steel plates. The gap is designed to allow the explosive zinc vapors to vent through the gaps resulting in acceptable weld joints. However, in commercial manufacturing environments, maintaining such a constant gap is difficult. Thus, the use of constant gap for fusion welded galvanized steel assemblies has not been found to be commercially feasible. Another solution has been to use an elongated laser beam to keep the melt pool heated for a longer period so that zinc vapors get enough time to escape from the weld zone. However, this method involves additional hardware and puts a constraint on the cost.

Thus, there is a need for a laser welded joint and method that joins overlapping layers of galvanized steel which limits the explosive behavior of zinc vapors, reduces porosity in the weld joint and produces a strong, sound and repeatable weld joint.

SUMMARY OF THE INVENTION

The present invention seeks to overcome the foregoing drawback by providing, in one aspect, a method for laser welding a pair of overlapping galvanized metal plates together. At least one of the pair of overlapping metal plates has a protective layer of metal. The method includes sandwiching a foil member and/or coating of appropriate material which will alloy with zinc to avoid violent evaporation between the pair of overlapping metal plates; welding the pair of overlapping metal plates; and melting the layer of metal and the foil member to form an alloy that is disposed between the overlapping metal plates.

In accordance with another aspect of the invention, a welded joint is formed by a laser beam welder. The joint includes a pair of overlapping metal plates. At least one of the pair of overlapping metal plates has a protective layer of zinc. Additionally, a metal filler member is disposed between the pair of overlapping metal plates. The metal filler member, the protective layer of zinc and the pair of overlapping metal plates are heated by the laser beam welder. The laser beam welder vaporizes the protective layer of zinc, melts the metal filler member and welds the pair of overlapping metal plates together. The vaporized layer of zinc is substantially trapped and absorbed in the molten metal filler member to form an alloy. The alloy is disposed between the pair of overlapping metal plates.

It is an object of the present invention to provide a weld joint and method that welds a pair of overlapping galvanized metal plates together and provides a metal filler member that sets a gap between the pair of galvanized metal plates and which when heated melts to trap and absorb vaporized zinc to form an alloy disposed between the pair of galvanized metal plates. The metal filler can be applied as foil, paint, slurry or wire to name a few.

It is another object of the present invention to provide a weld joint and method that lap welds a pair of galvanized metal plates together and provides a metal filler that melts when heated by the laser welder to trap and absorb vaporized zinc to reduce porosity in the welded joint.

These and other objects will become more apparent from reading the specification, drawings, and claims.

DETAILED DESCRIPTION OF THE PREFERRED EMBODIMENT

Figure 1:
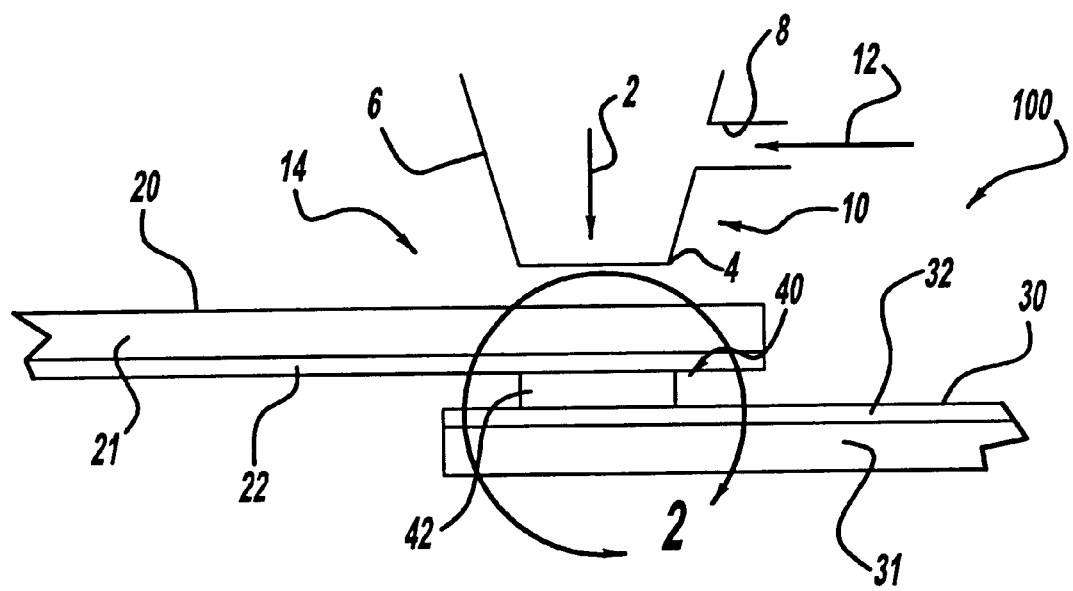
FIG. 1 is a partial cross-section view of a pair of overlapping metal coated plates with a metal spacer positioned beneath a nozzle through which a laser beam and inert gases are projected on to the plates and spacer.

As shown in FIGS. 1, 2a, 2b and 2c, the welded joint according to the present invention is designated by the numeral 100. The welded joint 100 includes a laser welder 10, a first metal member 20, a second metal member 30 and an alloying agent 40.

The laser welder 10 includes a laser beam 2 projected from a laser (not shown) through a nozzle 4 in a housing 6 as is conventionally known in the art. Inert gas 12 is pumped through an aperture 8 into the housing 6. The laser beam 2 is focused to be incident on a work piece 14 where a heat affected zone is created. Preferably, the inert gas 12 is a mixture of Helium (He) and Argon (Ar). The Helium is supplied into the aperture 8, for example only, at thirty-seven (37) standard cubic feet per hour (SCFH) while the Argon is supplied into the aperture 8, for example only, at fifteen (15) SCFH. Helium is used as a major shield gas for producing sound and shiny welds.

One end of the first metal member 20 overlaps one end of the second metal member 30. The first metal member 20 is a metal plate 21 with a protective metal layer 22. Preferably, the metal plate 21 is formed of steel and the protective metal layer 22 is formed of zinc. This combination is commonly referred to as a galvanized steel plate.

Similarly, the second metal member 30 is a metal plate 31 with a protective metal layer 32. Preferably, the metal plate 31 is formed of steel and the protective metal layer 32 is formed of zinc. The metal plates 21 and 31 are, by way of example only, 0.8 mm thick, and the protective metal layers 22 and 32 are formed of zinc in the amount of 70 grams per square meter. The above is not to be taken as a limitation on the invention since other thicknesses and coating weights are also within the scope of the invention.

The alloying agent 40 is a metal foil 42 which functions as a spacer to set a gap between the overlapping ends of the first member 20 and the second member 30. The metal foil 42 is preferably made of copper and is a nominal 0.004 inches thick. Alternatively, the copper metal foil 42 varies between 0.0035 to 0.0045 inches thick (this thickness may change based on the amount of zinc present in the form of coating). Copper is chosen mainly because of its good alloyability with zinc and its melting point of 1083°0 C. As will be described in more detail below, the copper metal foil 42 in its melted condition functions as a trapping and absorbing material for gaseous zinc 33. The copper and zinc form an alloy 46, such as, for example, brass. Other alloying elements such as nickel that have solubility in zinc and iron will also work. Similarly, other steels with different coatings and appropriate alloying elements will also work.

When welding the first and second metal members 20 and 30 together, the laser beam 2 is projected through the nozzle 4 to form a heat affected zone in the first and second metal members 20 and 30, respectively. Those skilled in the art will recognize that the heat affected zone becomes a weld zone 50 that penetrates both the first metal member 20, the second metal member 30 and the alloying agent 40 to heat them to their respective melt temperatures.

Figure 2A:
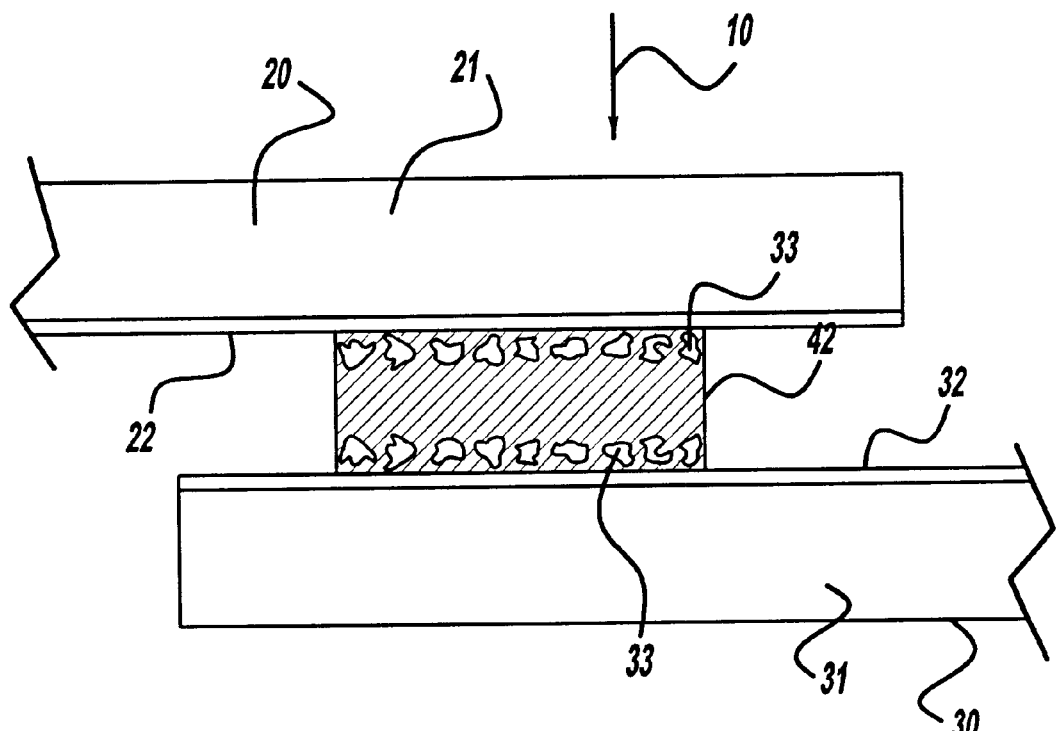
FIG. 2a is a blow up of a partial cross-section view in circle 2 of FIG. 1 when the metal coating is vaporized and the metal spacer is below its melt temperature.
Figure 2B:
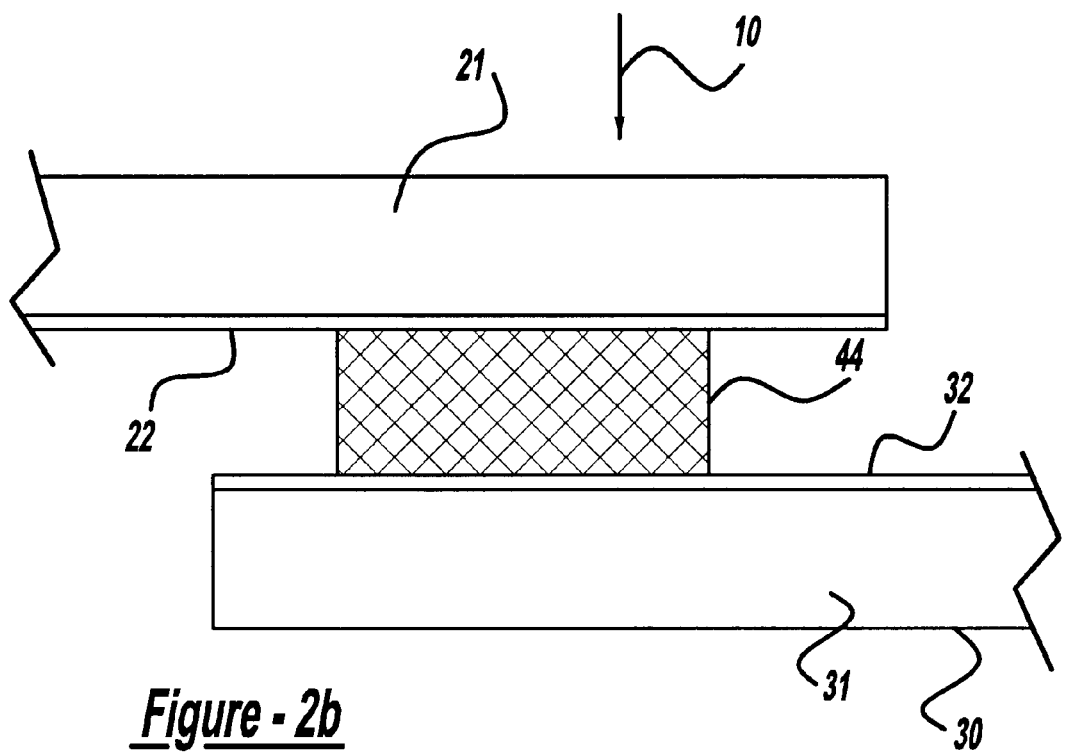
FIG. 2b is a blow up of a partial cross-section view in circle 2 of FIG. 1 when the metal coating is vaporized and the metal spacer is above its melt temperature, and is trapping and absorbing the vapors from the metal coating.
Figure 2C:
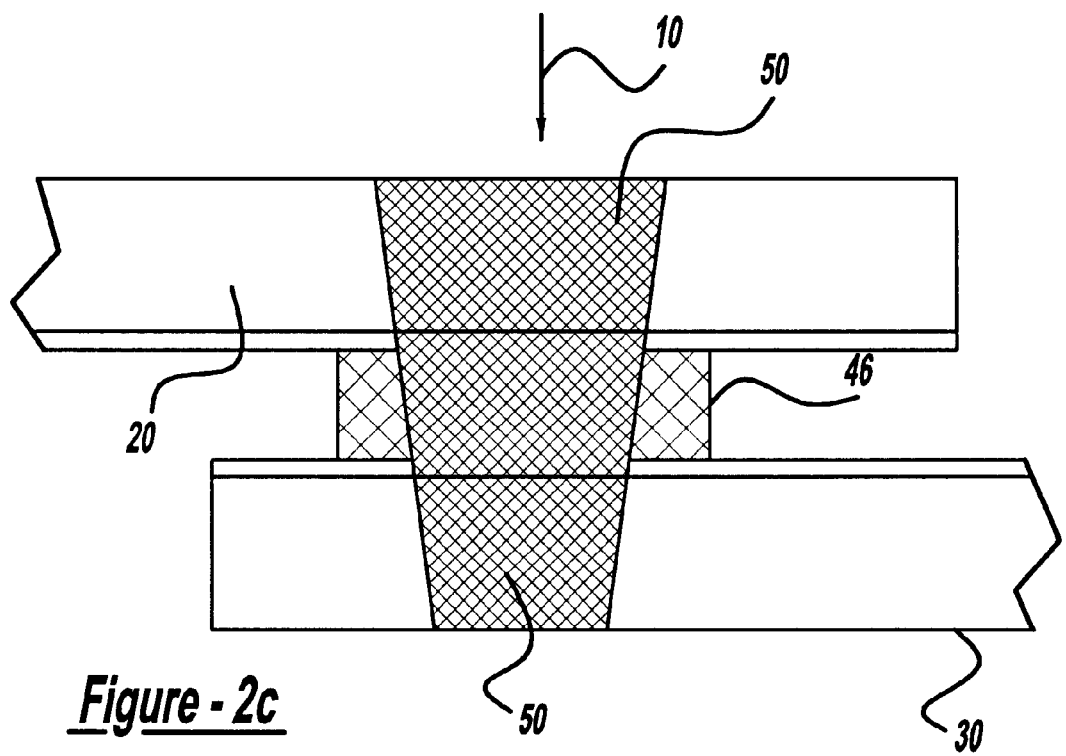
FIG. 2c is a blow up of a partial cross-section view in circle 2 of FIG. 1 after the pair of overlapping plates are melted by welding and an alloy is formed between the plates.

The laser welder 10, shown in FIGS. 2a, 2b, and 2c heats the first metal member 20, the second metal member 30 and the alloying agent 42 to various melt temperatures. FIG. 2a shows the first and second metal members 20 and 30 at 907° C., the melting point of zinc. At this temperature, zinc vapors 33 start forming and tend to become explosive with an increase in temperature. FIG. 2b shows the first and second metal members 20 and 30 at 1083° C., the melting point of copper. At this temperature, a melt pool 44 of metal is formed between the first and second metal members 20 and 30. Since this temperature is near the boiling point of zinc, and is attained very quickly during laser beam welding, the explosive zinc vapors 33 are trapped and absorbed in the melt pool 44. This condition creates an alloy metal 46. This alloying reaction is almost complete by the time the first and second metal members 20 and 30 melt. FIG. 2c shows the first and second metal members 20 and 30 at 1530° C., the melting point of steel. Prior to the time the weld zone 50 reaches this temperature, most of the zinc gets alloyed with the copper to form the alloy metal 46. Thus, when the melt pool 44 is formed, very little zinc vapors 33 remain to cause porosity and metal expulsion. Most of the zinc is retained within the weld in the form of the alloy metal 46, with minimal porosity.

The operation of the device will now be described with reference to an example of its use. Such an example is not to be taken as a limitation on the invention. The laser used is a 5 kW $CO_2$ RF excited Trumpf Laser. The laser has a $TEM_{10}$ beam mode with a focal radius of 0.268 mm and a raw beam radius of 11.456 mm. The distance between the beam source and the weld plates is adjustable so that the laser beam 2 is able to focus at the weld zone 50. The linear power can be varied between 2.5 kW to 3.5 kW. Preferably, the linear power to the laser weld is set at 3 kW. The overlapping first and second metal members 20 and 30 advance past the laser beam 2 at a linear speed of 70 inches per minute (IPM) to 90 IPM. Other parameters such as, fixturing and shield gas pressure is held constant.

As a result of alloying at the copper-steel interface, at the weld zone 50, a yellow substance, brass forms. The typical porosity measured across the weld is less than 1% and almost constant. Some slight porosity is formed due to a trace amount of zinc vapor which does not alloy with the copper and remains in the melt pool 44 until it solidifies.

At temperatures above 1083° C., the zinc vapors 33 attempt to move out of the weld zone 50 through the melt pool 44 but are trapped and absorbed. When the joint solidifies, and if some zinc vapors 33 still remain in the copper, some pores will form in the alloy metal 46. Such pores form outside the weld zone 50 and do not affect the strength and quality of the weld.

The above described weld produces a consistent joint strength of over 120 $MPa^3$ at 12% or higher elongations, whereas the general safe strength for such joints is about 83 $MPa^3$. Thus, the welds of the present invention are quite strong and satisfy all safety requirements.

The above example is not to be taken as a limitation in the scope of the invention but merely exemplary of the teachings of the present invention. It is to be understood that within the scope of the appended claims, the invention may be produced otherwise than as specifically described herein.

What is claimed is:

1. A method adapted for laser welding a pair of metal members together, at least one of the pair of metal members having a protective metal layer, each of the pair of metal members having a melt temperature greater than the melt temperature of the protective metal layer, said method comprising:

placing one end of one of the pair of metal members in an overlapping relation to an other end of one of the pair of metal members to form an overlapping section;

inserting a metal alloying agent between said overlapping section to form a gap between the pair of metal members; and laser welding the pair of metal members and said alloying agent together so that the protective metal layer and said alloying agent are melted together to form an alloy layer between the pair of metal members.

2. The method as claimed in claim 1 wherein said alloying agent has a thickness between 0.0035 to 0.0045 inches.

3. The method as claimed in claim 1 wherein each of the pair of metal members has a layer of zinc and wherein said laser welding step melts said zinc layer and said alloying agent.

4. The method as claimed in claim 1 wherein each of the pair of metal members includes a protective metal layer, said protective metal layer melting prior to said alloying agent and said alloying agent melting prior to at least one of the pair of metal members.

5. The method as claimed in claim 1 wherein said laser welding step includes a laser welder, said laser welder being a $CO_2$ laser.

6. The method as claimed in claim 1 wherein at least one of the pair of metal members includes a coating of zinc, and said alloying agent is formed of copper, wherein said laser welding step includes melting said coating of zinc and said copper alloying agent, said zinc coating forming a vapor and said copper forming a liquid, said liquid trapping and absorbing said vapor to form a brass alloy.

7. The method as claimed in claim 1 wherein the protective metal layer melts at a lower temperature than said alloying agent.

8. A method for laser welding a pair of overlapping metal plates together, at least one of the pair of overlapping metal plates having a protective layer of metal, said method comprising:

inserting a foil member between the pair of overlapping metal plates;

melting the protective layer of metal and said foil member together to form an alloy, said alloy being disposed between the pair of overlapping metal plates; and welding the pair of overlapping metal plates together.

9. The method as claimed in claim 8 wherein said foil member is made of copper.

10. The method as claimed in claim 8 wherein said melting step includes heating the pair of overlapping metal plates to a temperature above 1083° C.

11. The method as claimed in claim 8 wherein said foil member forms a filler between the pair of overlapping metal plates, said filler having a thickness between 0.0035 to 0.0045 inches thick.

12. The method as claimed in claim 8 wherein said welding step is a laser welder, said laser welder being a $CO_2$ laser having a gas mixture of Helium and Argon.

13. The method as claimed in claim 9 wherein the protective layer of metal is zinc and said copper foil member and said zinc form a layer of brass.

14. The method as claimed in claim 13 wherein during said melting step said zinc forms vapors and said copper forms a melt pool, said melt pool trapping and absorbing said vapors to form a weld interface layer between the pair of overlapping metal plates.

15. A welded joint formed by a laser beam welder, said joint comprising:
   a pair of overlapping metal plates, at least one of said pair of overlapping metal plates having a protective metal layer; and
   a metal filler member disposed between said pair of overlapping metal plates, said metal filler member, said protective metal layer and said pair of overlapping metal plates being heated by the laser beam welder, the laser beam welder vaporizing said protective metal layer, melting said metal filler member and welding said pair of overlapping metal plates together, said vaporized protective metal layer substantially being absorbed in said molten metal filler member to form an alloy, said alloy being disposed between said pair of overlapping metal plates.

16. The welded joint as claimed in claim 15 wherein said metal filler member is formed of copper.

17. The welded joint as claimed in claim 15 wherein the metal filler member is between 0.0035 and 0.0045 inches thick.

18. The welded joint as claimed in claim 16 wherein said protective metal layer is zinc and said copper metal filler member melts and absorbs said vaporized layer of zinc to form a brass alloy.

19. The welded joint as claimed in claim 16 wherein said pair of overlapping metal plates are made from a galvanized steel.

20. The welded joint as claimed in claim 16 where the laser beam welder has a gas mixture, said gas mixture including Helium and Argon.

\* \* \* \* \*